UNITED STATES PATENT OFFICE.

JOHN PETAN, OF PHILADELPHIA, PENNSYLVANIA.

ASH-SAGE COLOR-PRESERVING EXTRACT.

1,340,246.  Specification of Letters Patent.  Patented May 18, 1920.

No Drawing.  Application filed December 6, 1919.  Serial No. 343,039.

*To all whom it may concern:*

Be it known that I, JOHN PETAN, a subject of Austria, (who have declared my intention of becoming a citizen of the United States,) residing at #2544 Salmon street, Philadelphia, in the State of Pennsylvania, have invented a new and useful composition for ash-sage color-preserving extract to be used for improving, fixing, and preserving the relative fastness to sunlight exposure, salt water, washing, fulling, acids, and alkali of all organic coloring substances—viz., indigo and derivatives, archil, fustic, logwood, cochineal, dyewoods, and extracts—and also of inorganic coloring-matters, such as coal-tar derivatives, anilin and alizarin dyestuffs, synthetic indigo, etc., of which the following is a specification.

My composition consists of the following ingredients, combined in the proportion stated, viz:

| | |
|---|---|
| Water, substantially pure | 6 quarts |
| Stem or leaves (or both) of dry sage, (salvia) | 1 ounce |
| Fresh, green ash-wood (lanceolata) | 1 ounce |

These ingredients are to be thoroughly mixed by boiling in a kettle or vat, for one and a half hours, after which there should be added four more quarts of pure, cold water, and the mixture boiled for another hour and a half. After three hours' boiling, the composition is to be allowed one hour to cool off.

The resulting solution, combined in proportion stated, will yield a dark-brown, liquid, color-preserving extract, not exceeding 5 quarts, net, available for instant use, when recombined in the proportion stated, viz:

| | |
|---|---|
| Ash-sage color-preserving extract | 5 quarts |
| Dye or coloring substance | 2½ pounds |
| Cold water, substantially pure | 500 quarts | for each one hundred pounds of woolen or cotton yarn, or cloth, or of any other textile fabric subjected to any process of dyeing.

In using the above-named composition, the ingredients, recombined as stated herein, should be boiled for a sufficient length of time, to dissolve, after which the yarn or cloth is entered therein, and dyed in the usual way.

This ash-sage color-preserving extract is guaranteed to act as an effective mordant for all dye-stuffs and coloring substances, when applied to either animal, vegetable, or synthetic fibers, and to improve, fix, and preserve the color combination thereof.

By the use of the above-named ash-sage color-preserving extract, the relative fastness of the color of wool or cotton yarn or cloth, or of any other textile fabric undergoing any process of dyeing, can, at low cost, be improved and preserved, without impairment to the material.

I am aware that a method of manufacturing fast, light-proof coloring matters, which consists in heating a color pigment with a mixture of alizarin and of metallic salt, has been used for a similar purpose, and that a patent therefor was granted to Nicolai Wasiliewitch Turkin, of Moscow, Russia, on January 9, 1914, No. 1,173,330, but I am not aware that all or any ingredients of my composition have been used together.

I claim:

The ash-sage color-preserving extract, consisting of a solution from water, the stem or leaves (or both) of dry sage (salvia), and fresh, green ash-wood, (lanceolata).

JOHN PETAN.

Witnesses:
JOHN N. LANDBERG,
ROSE E. LANDBERG.